US009623331B2

(12) United States Patent
Kim

(10) Patent No.: US 9,623,331 B2
(45) Date of Patent: Apr. 18, 2017

(54) METHOD FOR PROVIDING GAME REPLAY, SERVER FOR PROVIDING GAME REPLAY, AND RECORDING MEDIUM STORING THE SAME

(71) Applicant: INTELLECTUAL DISCOVERY CO., LTD., Seoul (KR)

(72) Inventor: Woo Hyun Kim, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 252 days.

(21) Appl. No.: 14/384,615

(22) PCT Filed: Dec. 26, 2012

(86) PCT No.: PCT/KR2012/011512

§ 371 (c)(1),
(2) Date: Sep. 11, 2014

(87) PCT Pub. No.: WO2014/077454

PCT Pub. Date: May 22, 2014

(65) Prior Publication Data

US 2015/0038215 A1 Feb. 5, 2015

(30) Foreign Application Priority Data

Nov. 14, 2012 (KR) ........................ 10-2012-0129117

(51) Int. Cl.
*A63F 13/00* (2014.01)
*A63F 13/497* (2014.01)
(Continued)

(52) U.S. Cl.
CPC ............ *A63F 13/497* (2014.09); *A63F 13/35* (2014.09); *G06Q 50/10* (2013.01)

(58) Field of Classification Search
CPC ........ A63F 13/25; A63F 13/32; A63F 13/355; A63F 13/42; A63F 13/52; A63F 13/5372
(Continued)

(56) References Cited

U.S. PATENT DOCUMENTS

2007/0060389 A1* 3/2007 Shimizu .................. A63F 13/10
463/43
2010/0160040 A1 6/2010 Ikeda
(Continued)

FOREIGN PATENT DOCUMENTS

JP 2003-067779 A 3/2003
JP 2004-041645 A 2/2004
(Continued)

OTHER PUBLICATIONS

International Search Report issued in International Application No. PCT/KR2012/011512 on Jun. 26, 2013 along with English translation, 5 pages.

*Primary Examiner* — James S McClellan
(74) *Attorney, Agent, or Firm* — Sughrue Mion, PLLC

(57) ABSTRACT

A method for providing a game replay includes: receiving information related to a replay reinforcement character from the user terminal; obtaining game play data in a process in which the game play is completed or performed; detecting a visual reinforcement element for the replay reinforcement character; and providing the detected visual reinforcement element when a replay requirement related to the game play is received from the user terminal. The present invention provides the visual reinforcement element to the user terminal thereby increasing the game satisfaction of the user.

15 Claims, 8 Drawing Sheets

(51) Int. Cl.
*G06Q 50/10* (2012.01)
*A63F 13/35* (2014.01)

(58) Field of Classification Search
USPC .......................................................... 463/31, 42
See application file for complete search history.

(56) References Cited

U.S. PATENT DOCUMENTS

| | | | | |
|---|---|---|---|---|
| 2010/0292011 | A1* | 11/2010 | Kira ........................ | A63F 13/10<br>463/43 |
| 2011/0218945 | A1* | 9/2011 | Betzler ................... | G06F 15/18<br>706/12 |

FOREIGN PATENT DOCUMENTS

| | | | |
|---|---|---|---|
| JP | 2004-283419 | A | 10/2004 |
| JP | 2007-304727 | A | 11/2007 |
| KR | 10-2009-0129110 | A | 12/2009 |
| KR | 10-2010-0037413 | A | 4/2010 |

* cited by examiner

FIG. 6

| Attack attribute element |
| --- |
| Attack attribute element 1 |
| Attack attribute element 2 |
| ⋮ |

→

| Attack attribute element | Damage |
| --- | --- |
| Attack attribute element 1 | 10 |
| Attack attribute element 2 | 20 |
| ⋮ | ⋮ |

630

METHOD FOR PROVIDING GAME REPLAY, SERVER FOR PROVIDING GAME REPLAY, AND RECORDING MEDIUM STORING THE SAME

CROSS REFERENCE TO RELATED APPLICATIONS

This application is a 35 U.S.C. §371 National Phase Entry Application from PCT/KR2012/011512, filed Dec. 26, 2012, and designating the United States, which claims priority under 35 U.S.C. §119 to Korean Patent Application No. 10-2012-0129117 filed Nov. 14, 2012, which is incorporated herein in its entirety.

TECHNICAL FIELD

The present invention relates to a technique for providing a game replay. More particularly, the present invention relates to a method for providing a game replay supporting performance of a visual reinforcement game replay, a server for providing a game replay to perform the same, and a recording medium storing the same.

BACKGROUND ART

A game replay technique to support again watching a game played by a game user wherein the game user may review the user's game through a game replay.

Korea Patent Publication No. 10-2009-0129110 discloses a system for providing an online game replay which provides a replay file of a game event corresponding to a keyword and a time if the keyword indicating the game event and the time that the game event is preformed are input, when the user wants to watch the game event that has been generated in the past regardless of whether the user participated in the game event.

Korea Patent Publication No. 10-2010-0037413 discloses a game replay operation technique of exercising a game operation technique of an observer through a game operation technique exercise function of estimating a similarity between a time and a kind of button operation by a previous user and button information operated by the observer when the observer operates a button while watching button operation information by the previous user on a replay screen, as well as a replay of a screen and audio information for the game when the user performs the game.

In these prior arts, the replay image recorded at a certain time is simply provided and the button information is input in the providing of the replay image and is compared with conventional information, however the user does not add and provide additional direction for a desired character.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention provides a method for providing a game replay that maximizes a visual effect to a game user by using a visual reinforcement element, a server for providing a game replay to perform the same, and a recording medium storing the same. For example, this visual effect may be provided in a replay process.

The present invention provides a method for providing a game replay transmitting a game simulation to a game user visually by applying a replay process to a management game, a server for providing a game replay to perform the same, and a recording medium storing the same.

The present invention relates to a method for providing a game replay to provide a most impressive game scene to a game user by selecting an element (i.e., a visual reinforcement element) that maximizes a visual effect in a replay process, a server for providing a game replay to perform the same, and a recording medium storing the same.

Technical Solution

In exemplary embodiments, a method for providing a game replay includes: receiving information related to a replay reinforcement character from the user terminal; obtaining game play data in a process in which the game play is completed or performed; detecting a visual reinforcement element for the replay reinforcement character; and providing the detected visual reinforcement element when a replay requirement related to the game play is received from the user terminal.

In an exemplary embodiment, the method for providing the game replay may further include receiving the information related to the team controlled by the user terminal and including at least one game character before receiving the information related to the replay reinforcement character.

In an exemplary embodiment, the step of receiving the information related to the replay reinforcement character may further include receiving the information related to the game character determined through the selection among at least one game character as the information related to the replay reinforcement character if there is a selection of the user terminal.

In an exemplary embodiment, the step of receiving the information related to the replay reinforcement character may further include determining one among at least one game character as the replay reinforcement character based on an attribute element of each character in the information related to the team if there is no selection of the user terminal.

In an exemplary embodiment, the step of obtaining the game play data may further include generating the game play data through a simulation of the game play when a game character is not controlled through the user terminal.

In an exemplary embodiment, the step of detecting the visual reinforcement element for the replay reinforcement character may further include analyzing a visual reinforcement element of the replay reinforcement character based on the game play data.

In an exemplary embodiment, the step a detecting the visual reinforcement element for the replay reinforcement character may further include calculating an attribute element change of the replay reinforcement character through the game play data, and determining an attribute element that is most changed among the calculated attribute element change as the visual reinforcement element.

In an exemplary embodiment, the step of detecting the visual reinforcement element for the replay reinforcement character may further include determining an attack attribute element applying most damage to an opposite team by the replay reinforcement character based on the game play data as a highest attack attribute element, and determining the determined highest attack attribute element as the visual reinforcement element.

In an exemplary embodiment, the step of detecting the visual reinforcement element for the replay reinforcement character may further include respectively calculating an average value of an attribute element change for all game characters controlled by the user terminal based on the game play data, and determining a largest attribute element among the calculated average value of the attribute element change as the visual reinforcement element.

In an exemplary embodiment, the step of providing the detected visual reinforcement element may further include automatically providing the detected visual reinforcement element according to a certain condition of the game play when there is no replay requirement related to the game play from the user terminal and controlling to display the replay reinforcement character based on the provided visual reinforcement element by the user terminal.

Among exemplary embodiments, a server for providing a game replay includes: a character information receiving unit receiving information related to a replay reinforcement character from a user terminal; a game data obtaining unit obtaining game play data in a process in which a game play is completed or performed; a visual reinforcement element detecting unit detecting a visual reinforcement element for the replay reinforcement character; and a visual reinforcement element providing unit providing the detected visual reinforcement element when a replay requirement related to the game play is received from the user terminal.

In an exemplary embodiment, the server for providing the game replay may further include a team information receiving unit receiving the information related to the team including at least one game character and controlled through the user terminal.

In an exemplary embodiment, the character information receiving unit may receive the information related to the game character determined through the selection among at least one game character as the information related to the replay reinforcement character if there is a selection of the user terminal.

In an exemplary embodiment, the character information receiving unit may determine one among at least one game character as the replay reinforcement character based on an attribute element of each character in the information related to the team if there is no selection of the user terminal.

In an exemplary embodiment, the game data obtaining unit may generate the game play data through a simulation of the game play when a game character is not controlled through the user terminal.

In an exemplary embodiment, the visual reinforcement element detecting unit may analyze a visual reinforcement element of the replay reinforcement character based on the game play data.

In an exemplary embodiment, the visual reinforcement element detecting unit may calculate an attribute element change of the replay reinforcement character through the game play data, and may determine the attribute element that is largest changed among the calculated attribute element change as the visual reinforcement element.

In an exemplary embodiment, the visual reinforcement element detecting unit may determine an attack attribute element applying most damage to an opposite team by the replay reinforcement character based on the game play data as a highest attack attribute element, and determines the determined highest attack attribute element as the visual reinforcement element.

In an exemplary embodiment, the visual reinforcement element detecting unit may respectively calculate an average value of an attribute element change for all game characters controlled by the user terminal based on the game play data, and may determine a largest attribute element among the calculated average value of the attribute element change as the visual reinforcement element.

In an exemplary embodiment, the visual reinforcement element providing unit may automatically provide the detected visual reinforcement element according to a certain condition of the game play when there is no replay requirement related to the game play from the user terminal, and controls to display the replay reinforcement character based on the provided visual reinforcement element by the user terminal.

In exemplary embodiments, a recording medium recording a computer program providing a game replay performed in a server for providing a game replay connected to a user terminal includes: a function of receiving information related to a replay reinforcement character from a user terminal; a function of obtaining game play data in a process in which the game play is completed or performed; a function of detecting a visual reinforcement element for the replay reinforcement character; and a function of providing the detected visual reinforcement element when a replay requirement related to the game play is received from the user terminal.

Advantageous Effects

The method for providing the game replay and the techniques related thereto according to an exemplary embodiment of the present invention may provide the visual reinforcement element to the user terminal thereby increasing the game satisfaction of the user.

The method for providing the game replay and the techniques related thereto according to an exemplary embodiment of the present invention may apply the replay process to the management game.

The method for providing the game replay and the techniques related thereto according to an exemplary embodiment of the present invention may select the visual reinforcement element required for the replay process.

The method for providing the game replay and the techniques related thereto according to an exemplary embodiment of the present invention may calculate the average value of the attribute element change for all game characters controlled by the user terminal and determine the visual reinforcement element based on this thereby increasing the game satisfaction of the user.

DESCRIPTION OF THE DRAWINGS

FIG. 6 is a view illustrating an analysis of a visual reinforcement element through a highest attack attribute element.

MODE FOR INVENTION

Figure 1:
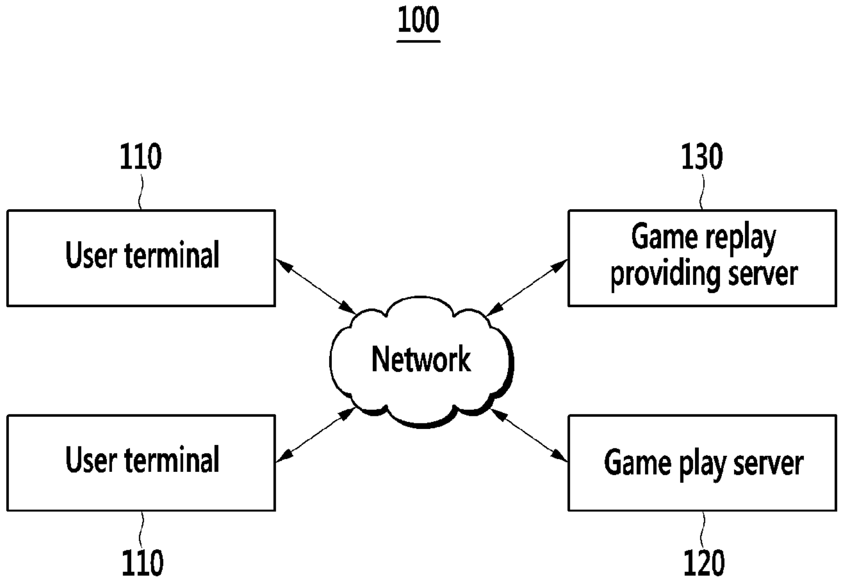
FIG. 1 is a view explaining a system for providing a game replay according to an exemplary embodiment of the present invention.

Descriptions of the present invention are exemplary embodiments for structural or functional descriptions, and the scope of the disclosed skill is not to be understood to be restricted by the exemplary embodiments described in the specification. That is, it is to be understood that the exemplary embodiments are intended to cover various modifications and equivalent arrangements included within the spirit and scope of the appended claims. Further, the proposed objects or effects in the disclosed technique do not signify that a specific exemplary embodiment may include all of them or include the effects, so the scope of the disclosed skill is not to be understood to be restricted by the exemplary embodiments described in the specification.

In addition, terms that are described in the present invention are to be understood as follows.

Terms such as "first," "second," etc., may be used to distinguish one constituent element from another constituent element, but the scope must not be restricted by the terms. For example, a first constituent element may be called a second constituent element, and similarly, the second constituent element may be called the first constituent element.

It is noted that when it is described that a certain constituent element is "connected" to another constituent element, they may be directly connected or electrically connected to each other, and a third constituent element may exist therebetween. On the contrary, it is also noted that when it is described that a certain constituent element is "directly connected" or "directly electrically connected" to another constituent element, a third constituent element does not exist therebetween. In addition, other expressions that describe relationships among constituent elements such as, "between," "just between," or "adjacent to" and "directly adjacent to" must be understood in a like manner.

An expression used in the singular encompasses an expression of the plural, unless it has a clearly different meaning in the context, and it is to be understood that terms such as "including," "having," etc. are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or may be added.

Identification codes (e.g., a, b, c, etc.) in respective stages are used for better comprehension and ease of description, but they do not necessarily describe an order of the respective stages, and the respective stages may be performed in a different order from the described order unless a specific order is written in the context. That is, the respective stages may be performed according to the described order, they may be performed substantially simultaneously, and they may be performed in an opposite order.

The present invention can be implemented as a computer-readable code in a computer-readable recording medium, and the computer-readable recording medium includes all types of recording apparatuses in which data that can be read by a computer system is stored. Examples of the computer-readable recording medium include a ROM, a RAM, a CD-ROM, a magnetic tape, a floppy disk, an optical data storage unit, a non-memory semiconductor, etc., and in addition, they include a recording medium implemented in the form of a carrier wave (for example, transmission through the Internet). The computer-readable recording medium may also be distributed to computer devices connected by a network so that the computer readable codes are stored and executed in a distributed fashion.

In addition, unless defined otherwise in the detailed description, all the terms have the same meaning as meanings generally understood by those skilled in the art to which the present invention pertains. Generally used terms such as terms defined in a dictionary should be interpreted as the same meanings as meanings within a context of the related art, and should not be interpreted as ideally or excessively formal meanings unless clearly defined in the present specification.

FIG. 1 is a view explaining a system for providing a game replay according to an exemplary embodiment of the present invention.

Referring to FIG. 1, a game replay providing system 100 includes a user terminal 110, a game play server 120, and a server for providing a game replay 130. In this case, the user terminal 110 may be connected to the game play server 120 and the server for providing the game replay 130 through a network (particularly, an internet).

The user terminal 110 may correspond to a computing device capable of being operated by an online game user. In detail, the user terminal 110 may be the computing device operating the game character by the online game user by performing the online game program or controlling a team including at least one game character. For example, the user terminal 110 may be a desktop, a laptop, a smart phone, or a tablet personal computer.

The game play server 120 corresponds to the computing device performing the game through communication with the user terminal 110. The game play server 120 may receive the control of the game character by the user terminal 100 in a case of a war action game to perform the game, and may simulate the team configured by the user terminal 110 in a case of a management game to perform the game.

The server for providing the game replay 130 corresponds to the computing device that can be connected to the user terminal 110 through the network, and may be managed by an online game service enterprise. The server for providing the game replay 130 will be described with reference to FIG. 2.

In this case, the game play server 120 and the server for providing a game replay 130 are only divided according to functions thereof, but may be realized in one server to be physically integrated. Also, the server for providing a game replay 120 may run a computer program interworked with a game performing terminal 110, and the computer program may be realized by a recording medium that may be readable by the computer.

Figure 2:
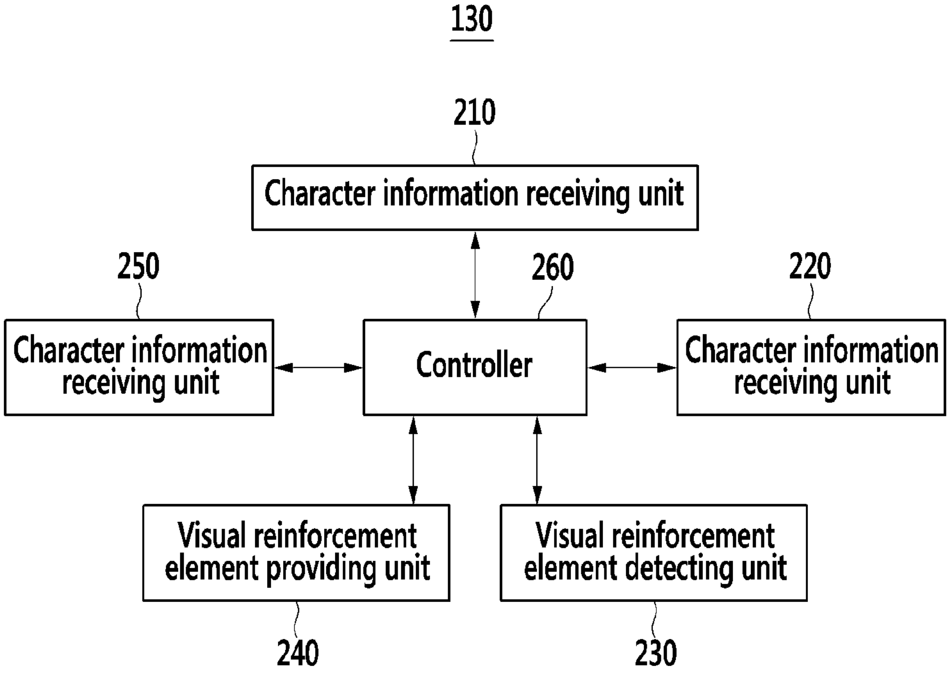
FIG. 2 is a block diagram explaining the server for providing a game replay shown in FIG. 1.

FIG. 2 is a block diagram explaining the server for providing the game replay 130 shown in FIG. 1.

Referring to FIG. 2, the server for providing the game replay 130 includes a character information receiving unit 210, a game data obtaining unit 220, a visual reinforcement element detecting unit 230, a visual reinforcement element providing unit 240, a team information receiving unit 250, and a controller 260.

The character information receiving unit 210 receives information related to a replay reinforcement character from the user terminal 110. In this case, the information related to the game replay reinforcement character may include characteristics (e.g., a jab kind of the character, a kind of an attack, and a kind of a weapon) of the game character determined in the user terminal 110.

In the exemplary embodiment, in the case of the war action game, the replay reinforcement character may correspond to the game character controlled by the user terminal 110, and the information related to the replay reinforcement character may correspond to the kind of the corresponding game character. The character information receiving unit 210 receives the kind of the corresponding game character from the user terminal 110 to determine the characteristic (e.g., an attack kind) of the corresponding game character, and this characteristic may be further firstly applied in the replay process.

In another exemplary embodiment, in the case of the management game, the replay reinforcement character may correspond to the certain game character selected by the user terminal 110 among the team, and the information related to the replay reinforcement character may correspond to the information related to the certain game character. In this case, the team may include at least one game character selected by the user terminal 110. The character information receiving unit 210 receives at least one game character configuring the team and the certain game character particularly having the interest of the user from the user terminal 110 to determine the characteristic (e.g., the kind of the attack) of the certain game character, and this characteristic may be used in the replay process. On the other hand, the management game may not be performed by the separate control of the game character, but may be performed through a simulation by the game play server 120 if the team or the character is determined.

The game data obtaining unit 220 obtains the game play data in the process in which the game play is completed or performed. In this case, the game play data includes a piece of data that is exchanged between the user terminal 110 and the game play server 120 in the process that is controlled by the user or is performed through the simulation. For example, the game play data may include the control (e.g., a certain attack command) by the user terminal 110 or the result (e.g., a game result according to a team configuration).

The visual reinforcement element detecting unit 230 detects the visual reinforcement element for the replay reinforcement character. The replay reinforcement character includes at least one attribute element determining an ability of the corresponding game character. For example, in a case of a soccer game, the attribute element may respectively correspond to a heading capacity, a tackle capacity, a shoot capacity, a speed capacity. The visual reinforcement element may include one among at least one attribute element. The operation of the visual reinforcement element detecting unit 230 will be described with reference to FIG. 5 to 7.

If the replay requirement related to the game play is received from the user terminal 110, the visual reinforcement element providing unit 240 provides the visual reinforcement element detected by the visual reinforcement element detecting unit 230. The visual reinforcement element providing unit 240 reflects the visual reinforcement element to the replay reinforcement character through the user terminal 110 in the game replay process. In an exemplary embodiment, in a point of the user terminal 110, the user terminal 110 may previously store a change element of the game character and the game character according to the replay reinforcement element, and receives the visual reinforcement element from the visual reinforcement element providing unit 240 to reflect the visual reinforcement element to the replay reinforcement character.

On the other hand, the visual reinforcement element providing unit 240 automatically provides the visual reinforcement element according to a certain condition of the game play although the replay requirement related to the game play from the user terminal 110 to display the replay reinforcement character is based on the visual reinforcement element by the user terminal 110. Here, the certain condition may include a game suspended state, a next step loading state, and a scene conversion state.

The team information receiving unit 250 is controlled through the user terminal 110 or receives the information related to the team including at least one game character that is simulated through the game play server 120. This team information essentially includes the replay reinforcement character corresponding to the game character selected by the user.

The controller 260 controls the operation and the data flow of the character information receiving unit 210, the game data obtaining unit 220, the visual reinforcement element detecting unit 230, the visual reinforcement element providing unit 240, and the team information receiving unit 250.

Figure 3:
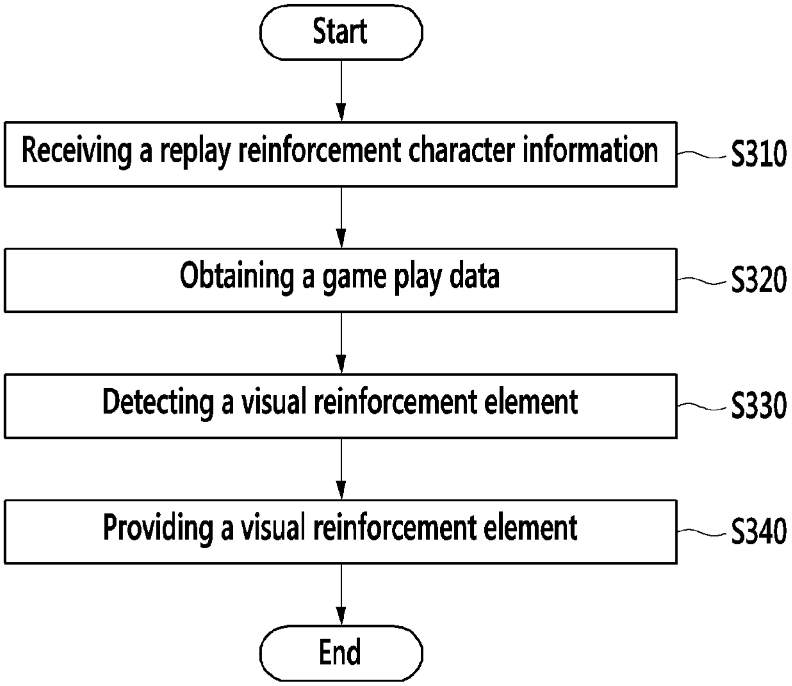
FIG. 3 is a flowchart explaining a process for providing a game replay performed in the server for providing a game replay of FIG. 2.

FIG. 3 is a flowchart explaining a process for providing a game replay performed in the server for providing a game replay of FIG. 2.

Figure 4:
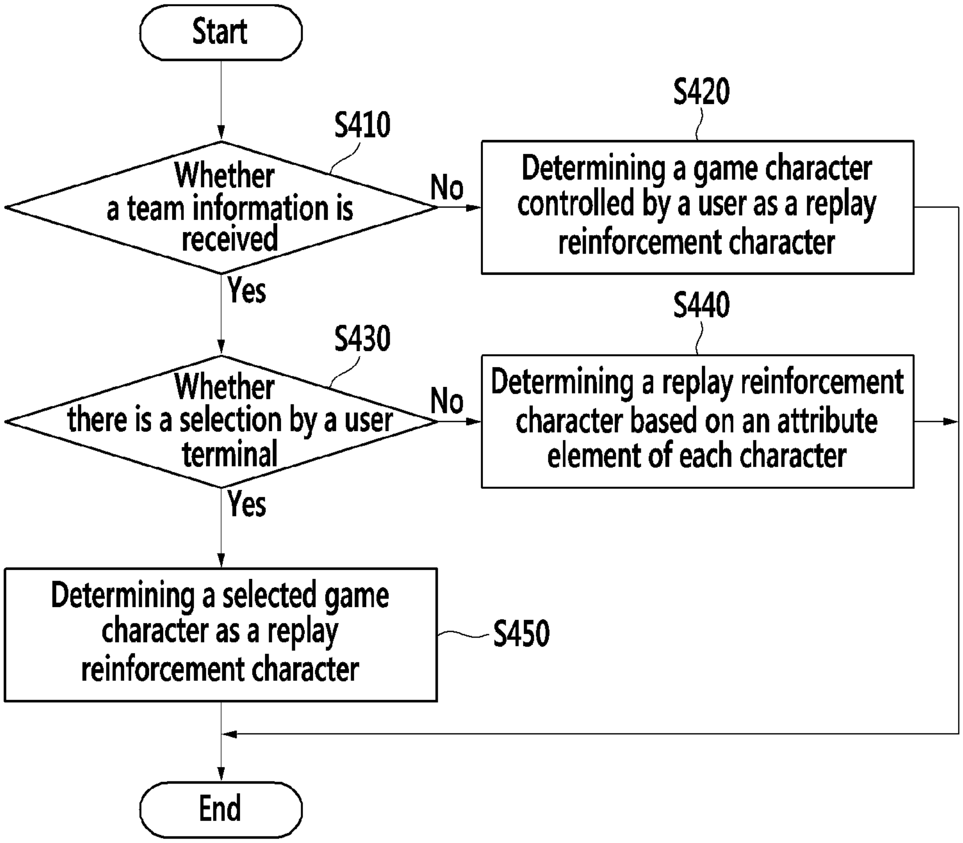
FIG. 4 is a flowchart explaining a process for providing a game replay according to an exemplary embodiment of the present invention.

The character information receiving unit 210 receives the information related to the replay reinforcement character from the user terminal 110 (step S310). On the other hand, the team information receiving unit 250 may previously receive the information for the team in this process. The team is controlled through the user terminal 110 and includes at least one game character. FIG. 4 is a flowchart explaining a process for receiving the information related to the replay reinforcement character.

In FIG. 4, the character information receiving unit 210 selects the game character controlled by the user as the replay reinforcement character if the information related to the team is not received by the team information receiving unit 250 (steps S410 and S420).

The character information receiving unit 210 determines whether the at least one game character is selected in the corresponding team by the user terminal 110 if the information related to the team is received by the team information receiving unit 250 (steps S410 and S430). Next, the steps S440 and S450 describe the case that the information related to the team is received.

The character information receiving unit 210 receives the information related to one character among at least one game character based on the attribute element of the game character in the corresponding team as the information related to the replay reinforcement character if at least one game character is not selected (steps S430 and S440).

The character information receiving unit 210 receives the information related to the game character as the information of the replay reinforcement character if at least one game character is selected (step S450).

Again referring to FIG. 3, the game data obtaining unit 220 obtains the game play data in the process in which the game play is completed or is performed (step S320). In this case, the game play data includes the data that is exchanged between the user terminal 110 and the game play server 120 in the process that is controlled by the user or is performed through the simulation. For example, the game play data may include the control (e.g., the certain attack command) by the user terminal 110 or the result (e.g., the game result according to the team configuration) of the simulation.

The visual reinforcement element detecting unit 230 may detect the visual reinforcement element for the replay reinforcement character (step S330) and may analyze and detect the replay reinforcement element based on the game play data. This process will be described with reference to FIG. 5 to FIG. 7.

Figure 5:
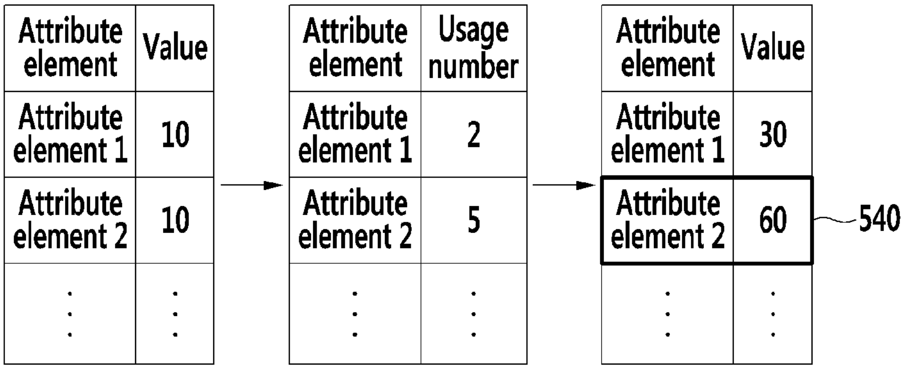
FIG. 5 is a view illustrating an analysis of a visual reinforcement element through a change amount of an attribute element according to another exemplary embodiment of the present invention.
Figure 7:
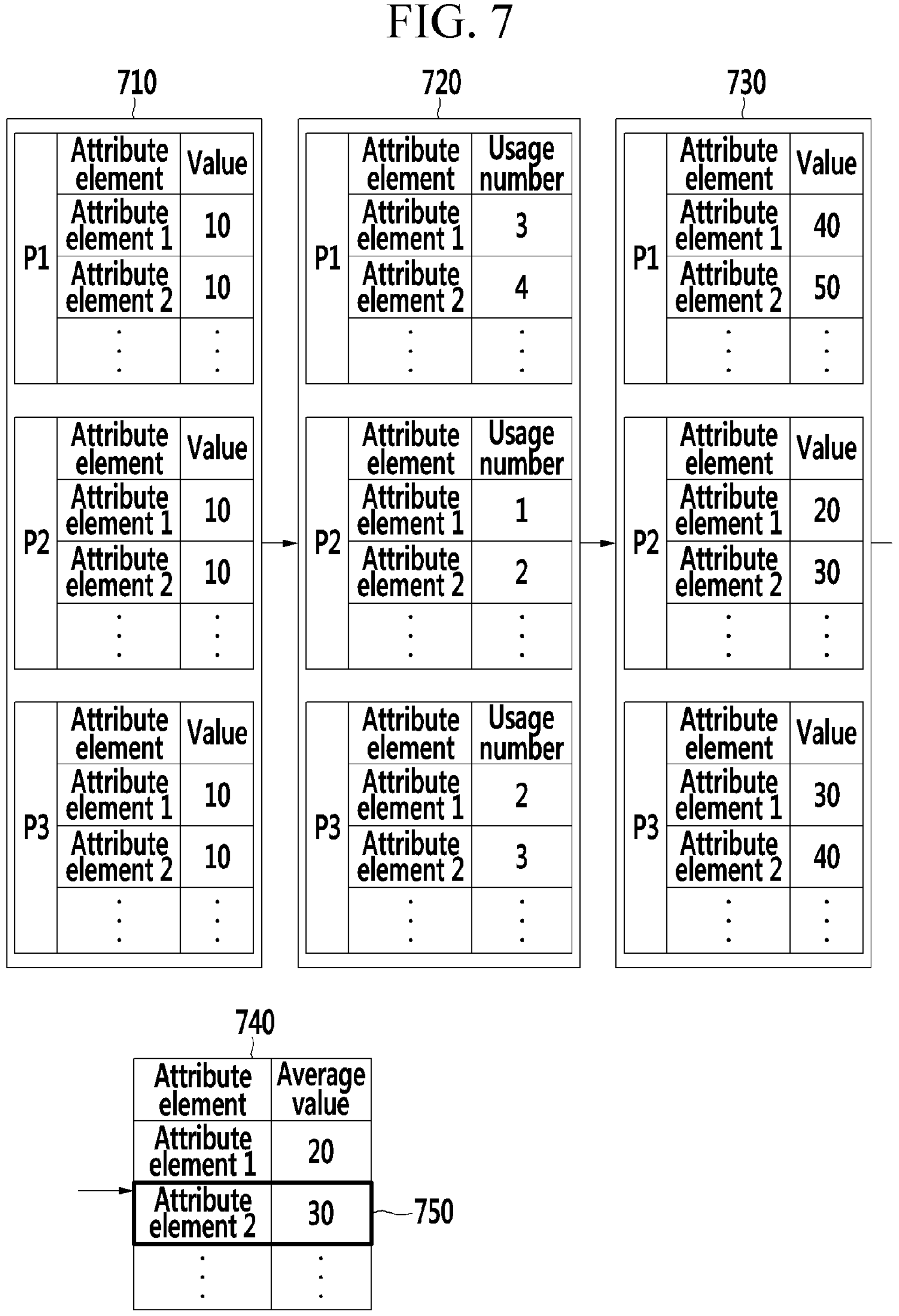
FIG. 7 is a view illustrating an analysis of a visual reinforcement element through an attribute element average.

FIG. 5 to FIG. 7 are views explaining exemplary embodiments of the visual reinforcement element detecting unit.

FIG. 5 is a view illustrating an analysis of a visual reinforcement element through a change amount of an attribute element, FIG. 6 is a view illustrating an analysis of a visual reinforcement element through a highest attack attribute element, and FIG. 7 is a view illustrating an analysis of a visual reinforcement element through an attribute element average.

In FIG. 5, at least one attribute element 510 (e.g., in the case of the soccer game, the heading attribute element or the dribble attribute element) in the replay reinforcement character may have the certain value before the game play. At least one attribute element may reflect the game play data 520 and may be renewed into at least one attribute element 530 after the game play. The visual reinforcement element detecting unit 230 may determine the attribute element (e.g., 540) that is most changed in the at least one attribute element 530 as the visual reinforcement element.

In FIG. 6, at least one attribute element 610 in the replay reinforcement character may be previously divided as a plurality of attack attribute elements (e.g., in a case of a tennis game, a serve attack, a smash attack, a volley attack etc.) before the game play. The visual reinforcement element detecting unit 230 may determine the attack attribute element (e.g., 630) applying the largest damage to an opposite party (or an opposite team) as the visual reinforcement element if the damage is generated to the opposite party (or the opposite team) through the attack attribute element.

In FIG. 7, the visual reinforcement element detecting unit 230 may calculate an average value of the attribute element change for all game characters controlled by the user terminal 110 based on the game play data and may determine the changed attribute element as the visual reinforcement element. In detail, the visual reinforcement element detecting unit 230 reflects game play data 720 to an attribute element 710 of the game characters in the team to renew the attribute element 710 as the attribute element 730. Next, the visual reinforcement element detecting unit 230 may calculate an average value 740 for the attribute element change of the game character and may determine the largest changed attribute element (e.g., 750) as the visual reinforcement element. This process may be determined through Equation 1.

The visual reinforcement element=MAX[{AVERAGE(the change amount of<the attribute element 1>for each game character), AVERAGE (the change amount of<attribute element 2>for each game character . . . }] [Equation 1]

Again referring to FIG. 3, the visual reinforcement element providing unit 240 provides the visual reinforcement element of the replay requirement related to the game play (step S340). That is, the visual reinforcement element providing unit 240 provides the visual reinforcement element to reflect the visual reinforcement element to the replay reinforcement character in the game replay process by the user terminal 110.

Figure 8:
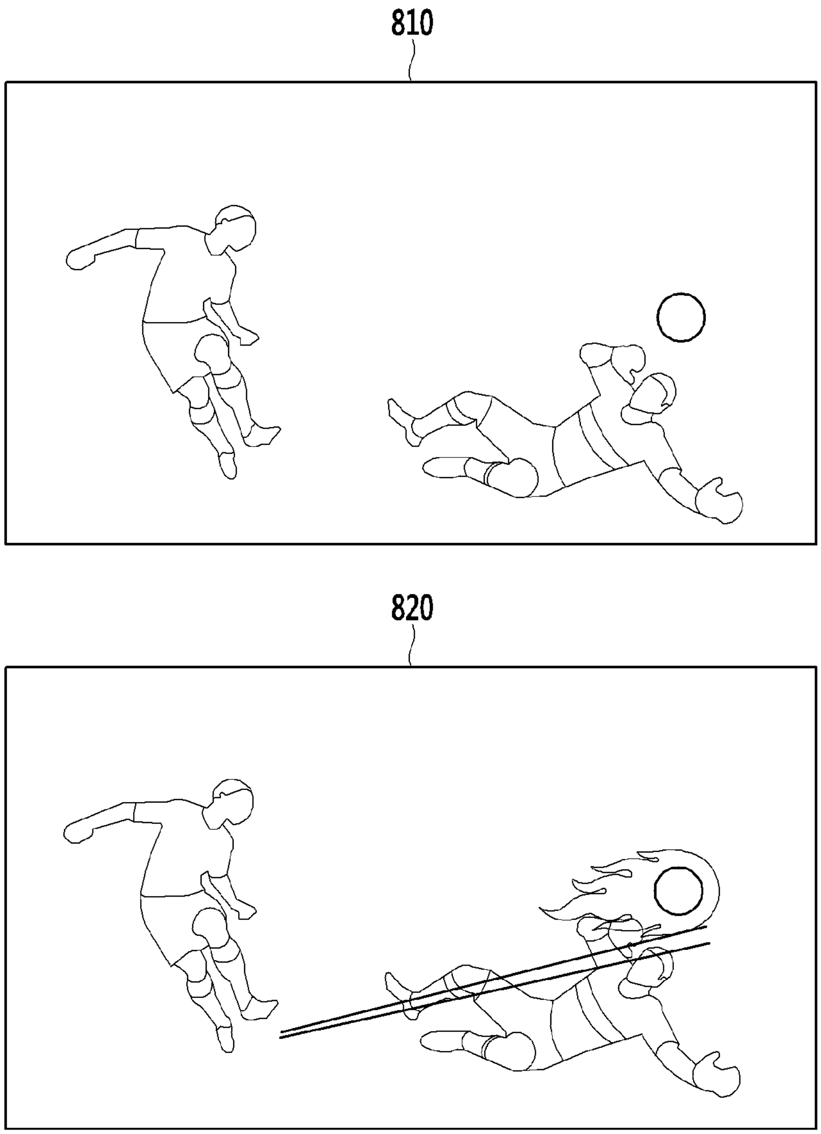
FIG. 8 is a view illustrating a replay scene after/before applying a visual reinforcement element.

FIG. 8 is a view illustrating a replay scene after/before applying a visual reinforcement element.

The user terminal 110 may display the replay scene 810 before the application of the visual reinforcement element and may display the replay scene 820 after the application of the visual reinforcement element. Resultantly, the user terminal 110 provides various visual effects to the user through the visual reinforcement element to improve the game satisfaction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for providing a game replay performed in a server for providing a game replay connected to a user terminal, comprising:

receiving information corresponding to a plurality of attribute elements of a replay reinforcement character from the user terminal;

obtaining game play data in a process in which the game play is completed or performed;

determining respective values for the plurality of attribute elements based on the game play data;

determining one of the plurality of attribute elements as a visual reinforcement element for the replay reinforcement character based on the respective values of the plurality of attribute elements; and providing the determined visual reinforcement element when a replay requirement related to the game play is received from the user terminal.

2. The method of claim 1, wherein the obtaining the game play data further includes generating the game play data through a simulation of the game play when a game character is not controlled through the user terminal.

3. The method of claim 1, wherein the plurality of attribute elements is a plurality of attack attribute elements each corresponding to a different attach of the replay reinforcement character.

4. The method of claim 1, wherein the determining the respective values for the plurality of attribute elements based on the game play data further includes:

calculating an amount of change for each of the respective values through the game play data; and determining an attribute element of the plurality of attribute elements having a value that is most changed among the calculated amounts as the visual reinforcement element.

5. The method of claim 3, wherein the determining the respective values for the plurality of attribute elements based on the game play data further includes:

determining an attack attribute element of the plurality of attack attribute elements applying most damage to an opposite team by the replay reinforcement character based on the game play data as a highest attack attribute element; and determining the determined highest attack attribute element as the visual reinforcement element.

6. The method of claim 1, wherein the determining the respective values for the plurality of attribute elements based on the game play data further includes:

for each of the plurality of attribute elements, calculating an average value of an attribute element change for all game characters controlled by the user terminal based on the game play data; and determining a largest attribute element among the calculated average value of the attribute element change as the visual reinforcement element.

7. The method of claim 1, wherein the providing the determined visual reinforcement element further includes automatically providing the determined visual reinforcement element according to a certain condition of the game play when there is no replay requirement related to the game play from the user terminal and controlling to display the replay reinforcement character based on the provided visual reinforcement element by the user terminal.

8. A server for providing a game replay, comprising:

a character information receiving unit receiving information corresponding to a plurality of attribute elements of a replay reinforcement character from a user terminal;

a game data obtaining unit obtaining game play data in a process in which a game play is completed or performed;

a visual reinforcement element detecting unit determining respective values for the plurality of attribute elements based on the game play data, and determining one of the plurality of attribute elements as a visual reinforcement element for the replay reinforcement character based on the respective values of the plurality of attribute elements; and a visual reinforcement element providing unit providing the determined visual reinforcement element when a replay requirement related to the game play is received from the user terminal.

9. The server of claim 8, wherein the game data obtaining unit generates the game play data through a simulation of the game play when the game character is not controlled through the user terminal.

10. The server of claim 8, wherein the plurality of attribute elements is a plurality of attack attribute elements each corresponding to a different attack of the replay reinforcement character.

11. The server of claim 8, wherein the visual reinforcement element detecting unit calculates an amount of change for each of the respective values of the replay reinforcement character through the game play data and determines an attribute element of the plurality of attribute elements having a value that is largest changed among the calculated amounts as the visual reinforcement element.

12. The server of claim 10, wherein the visual reinforcement element detecting unit determines an attack attribute element of the plurality of attach attribute elements applying most damage to an opposite team by the replay reinforcement character based on the game play data as a highest attack attribute element, and determines the determined highest attack attribute element as the visual reinforcement element.

13. The server of claim 8, wherein the visual reinforcement element detecting unit, for each of the plurality of attribute elements, calculates an average value of an attribute element change for all game characters controlled by the user terminal based on the game play data, and determines a largest attribute element among the calculated average values of the attribute element change as the visual reinforcement element.

14. The server of claim 8, wherein the visual reinforcement element providing unit automatically provides the determined visual reinforcement element according to a certain condition of the game play when there is no replay requirement related to the game play from the user terminal, and controls to display the replay reinforcement character based on the provided visual reinforcement element by the user terminal.

15. A non-transitory recording medium recording a computer program providing a game replay performed in a server for providing a game replay connected to a user terminal, comprising:

a function of receiving information corresponding to a plurality of attribute elements of a replay reinforcement character from a user terminal;

a function of obtaining game play data in a process in which the game play is completed or performed;

a function of determining respective values for the plurality of attribute elements based on the game play data;

a function of determining one of the plurality of attribute elements as a visual reinforcement element for the replay reinforcement character based on the respective values of the plurality of attribute elements; and a function of providing the determined visual reinforcement element when a replay requirement related to the game play is received from the user terminal.

* * * * *